United States Patent
Farrell et al.

(10) Patent No.: US 6,222,642 B1
(45) Date of Patent: Apr. 24, 2001

(54) SYSTEM AND METHOD FOR ELIMINATING BACKGROUND PIXELS FROM A SCANNED IMAGE

(75) Inventors: Barbara L. Farrell, Ontario; Jeng-nan Shiau, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/131,912

(22) Filed: Aug. 10, 1998

(51) Int. Cl.⁷ ............................. G06K 15/02; G06K 9/52; G06T 5/40; H04N 1/407
(52) U.S. Cl. .................. 358/1.9; 358/455; 358/463; 358/465; 382/169; 382/172; 382/275
(58) Field of Search ..................... 382/171, 172, 382/169, 168, 273, 254, 275, 270, 176; 358/1.9, 455, 462, 463, 464, 465, 466, 452, 448

(56) References Cited

U.S. PATENT DOCUMENTS

| | | | |
|---|---|---|---|
| 4,656,665 | * 4/1987 | Pennebaker et al. | 382/172 |
| 4,742,557 | * 5/1988 | Ma et al. | 382/171 |
| 5,093,871 | * 3/1992 | Klein et al. | 382/172 |
| 5,179,599 | * 1/1993 | Formanek | 382/172 |
| 5,282,061 | 1/1994 | Farrell . | |
| 5,293,430 | 3/1994 | Shiau et al. . | |
| 5,751,848 | 5/1998 | Farrell . | |
| 5,781,658 | * 7/1998 | O'Gorman et al. | 382/171 |
| 5,848,183 | * 12/1998 | Farrell et al. | 382/172 |
| 5,889,885 | * 3/1999 | Moed et al. | 382/264 |
| 6,043,900 | * 3/2000 | Feng et al. | 358/1.9 |

FOREIGN PATENT DOCUMENTS

578875 A1 * 1/1994 (EP) .................. H04N/1/40

* cited by examiner

Primary Examiner—Scott Rogers
(74) Attorney, Agent, or Firm—Fay, Sharpe, Fagan, Minnich & McKee, LLP (57) ABSTRACT

An image desired to be reproduced is scanned to determine its video pixel gray values. A histogram generator generates a histogram distribution representing a frequency of the gray values. The histogram distribution is analyzed to determine a background peak gray value of the image and a standard deviation of the histogram distribution based on a Gaussian approximation. A thresholding circuit dynamically adjusts the background peak value based on the standard deviation and a selected scaling factor to generate a background threshold value. The background threshold value expands a range of background gray values in the image which are eliminated during image reproduction. Eliminating substantially all background gray values improves the quality of the reproduced image.

21 Claims, 4 Drawing Sheets

SYSTEM AND METHOD FOR ELIMINATING BACKGROUND PIXELS FROM A SCANNED IMAGE

FIELD OF THE PRESENT INVENTION

The present invention is directed to the imaging arts. It finds particular application to a system or method of determining and eliminating background pixels from a scanned image during reproduction of the image and will be described with particular reference thereto. Of course, it is to be appreciated that the invention will also find application to other image reproduction processes and devices such as displaying or printing a digital image or copying an image.

BACKGROUND OF THE PRESENT INVENTION

In a conventional reproduction machine, a document (image) is scanned so that light reflected from the document causes a latent image of electrical charges to form on a photoreceptor. This latent image is then developed with toner, and the toner is transferred to a recording medium to produce a copy of the scanned document. These systems are commonly referred to as light-lens or non-digital copying systems.

The quality of a light-lens reproduction machine is a function of how well the copy matches the original. As is well know, various factors can impact this quality. For example, the scanning station can impact the quality if the optical path of the scanning station is not properly aligned. Also, the development station can impact the quality if a photoreceptor is not properly cleaned.

With the advent of digital reproduction machines, the above copy process for making a copy has changed. In a digital process, a document or image is scanned by a digital scanner which converts the light reflected from the document into electrical charges representing the light intensity from predetermined areas (pixels) of the document. These charges, after suitable processing, are converted into image signals or pixels of image data to be used by the digital reproduction machine to recreate the scanned image.

The pixels of image data are processed by an image processing system which converts the pixels of image data into signals which can be utilized by a printing device to recreate the scanned image. This printing device may be either a xerographic printer, ink jet printer, thermal printer, or any other type of printing device which is capable of converting digital data into a mark on a recording medium.

As with the light-lens systems, the quality of a reproduction machine is still a function of how well the copy matches the original. However, in this digital environment, other factors can now contribute to or impact the quality of the reproduced image. For example, the scanner can impact the quality if the scanner is not properly calibrated. Also, the output (printing) device can impact the quality if a printhead is clogged or a photoreceptor is not properly cleaned. But, the aspect of the digital system which can have the greatest impact is the digital (image) processing of the image data because a digital machine must convert light to a digital signal and then convert the digital signal to a mark on a recording medium. In other words, the image processing system provides the transfer function between the light reflected from the document to the mark on the recording medium.

Quality can be measured in many different ways. One way is to look at the characteristics of the reproduced image. An example of such a characteristic for determining the quality of the reproduced image is the contrast of the image. The contrast of an imaged (copied) document is the most commonly used characteristic for measuring quality since contrast provides a good overall assessment of the image's quality.

In a digital reproduction machine, the image processing system can greatly impact the contrast of the image. Thus, to assure high quality at the output printing device, it is desirable to know the contrast of the image being scanned prior to the image processing stage because, with this knowledge, the image processing system can process the image data so that the reproduced image has the proper contrast. One way of obtaining this contrast information prior to digital image processing is for the digital reproduction machine to generate a grey level histogram, which gives an easy to read measure of the image contrast. The image or grey level histogram describes the statistical distribution of grey levels of an image in terms of the number of pixels at each grey level. In other words, the number of pixels within an image that are associated with a certain grey level.

A histogram can be represented graphically with intensity on the horizontal axis from 0 to 255, if an eight-bit per pixel sampling resolution is utilized, and the number of pixels on the vertical axis. Using this graphical representation, a histogram can illustrate whether an image is basically dark or light and high or low contrast. It is important to know that when an image is represented by histogram, all spatial information is lost. The histogram specifies the number of pixels of each grey level but gives no indication where these pixels are located in the image. In other words, very different images may have very similar histograms.

Conventionally, when creating a histogram of the scanned image, a digital reproduction system samples a document, collects intensity data from the document, and uses this information to determine the document's background value. In such conventional systems, the computed background value of the document represents the average intensity of the document.

While this conventional approach produces reasonable results for many documents, the conventional approach is sensitive to the image's composition and is also insensitive to intensity variations within a document's background. As the make up of the document shifts from predominantly background to text and graphics, the value reported by an averaging scheme will change proportionally. If the magnitude of this change is significant, the area corresponding to the change will manifest itself in the output copy of the scanned document as a thinning or loss of fine lines and characters.

Therefore, it is desirable to utilize a system and method for generating histogram data which is insensitive to the image composition in the sampled area and is sensitive to intensity variations within the document's background. When utilizing such a system or method, the background value and black threshold value of the document will not change as the sample region shifts in character from predominantly background to text and graphics, and thus, the output copy from the printing device will not realize a thinning or loss of fine lines and characters.

SUMMARY OF THE PRESENT INVENTION

In one aspect of the present invention, a system for eliminating background grey values from an image is provided. A scanner scans and converts the image into digital signals representing grey values of the image. A histogram generator generates a histogram of frequencies of the grey values of the image and determines a background peak value representing a background color having a peak frequency in the histogram. A thresholding circuit generates a background threshold value based on a difference between a background peak value and a scaled offset. The scaled offset includes a scaling factor which is selectable. The background threshold value is a cut-off value for eliminating background grey values from reproduction of the image.

In another aspect of the present invention, a method of suppressing a background image from a document being reproduced is provided. The document is formed of a plurality of video pixels each having a grey value. A histogram is generated representing a frequency of occurrence of the grey values based on the plurality of video pixels. A background peak grey value is determined from the histogram where the background peak grey value is a grey value having a greatest frequency of occurrence in the histogram. The background peak grey value is a basis for identifying a range of grey values representing the background image. The range of grey values representing the background image is expanded by scaling the background peak grey value. The document is then reproduced without the range of grey values representing the background image.

One advantage of the present invention is that image reproduction is improved by eliminating more background grey values from the image.

Another advantage of the present invention is that the range of background values determined from a histogram distribution can be easily and selectively expanded.

Another advantage of the present invention is that a background threshold value is implemented in hardware at a low cost using a scaling factor of ⅛ increments.

Another advantage of the present invention is that a user can dynamically adjust the range of background grey values to be suppressed which improves the quality of the image being reproduced.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
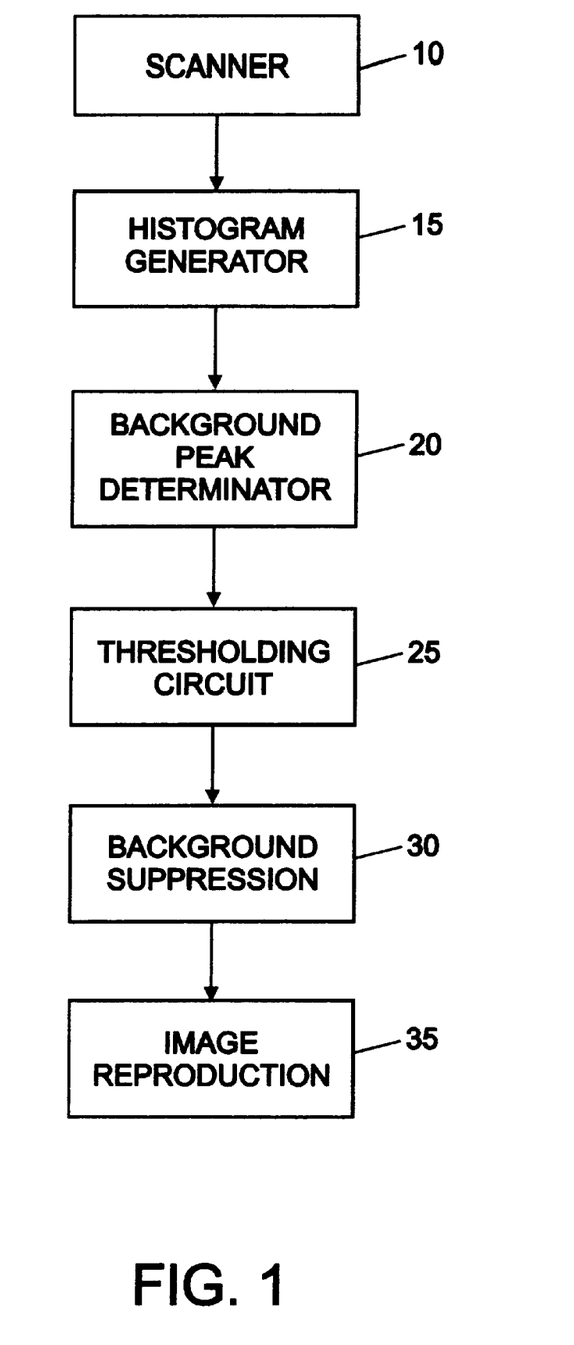
FIG. 1 is a block diagram of an image reproduction system including background suppression in accordance with the present invention.

With reference to FIG. 1, a scanner 10 scans an image to be reproduced. Video pixel grey values are determined from the scanned image which are used to generate a histogram distribution. The histogram is analyzed to determine a background grey value for the image.

As noted above, it is desirable to generate a background grey value which is not sensitive to the image's composition and is sensitive to intensity variations within a document's background. To calculate this background value, a histogram generator 15 generates a histogram of the video pixels representing the scanned image. A method of determining a background grey value from a histogram, which is incorporated herein by reference, is described in U.S. Pat. No. 5,751,848 entitled "A System And Method For Generating And Utilizing Histogram Data From A Scanned Image" assigned to the present assignee.

In the preferred embodiment, the video pixels used to generate the histogram are from within a programmed window location near the leading edge of the image (document) to be reproduced. Moreover, preferably, the histogram and the background value of the image are generated during a single scan of the image.

Upon obtaining the histogram data, grey values including a white peak and a white threshold value are determined. The white peak value is the grey level with the greatest number of pixels having an intensity related to the background value (typically white) of the image being scanned. The white threshold value is a background threshold value calculated from the histogram and serves as a cut-off for eliminating background grey values from being reproduced.

Figure 2:
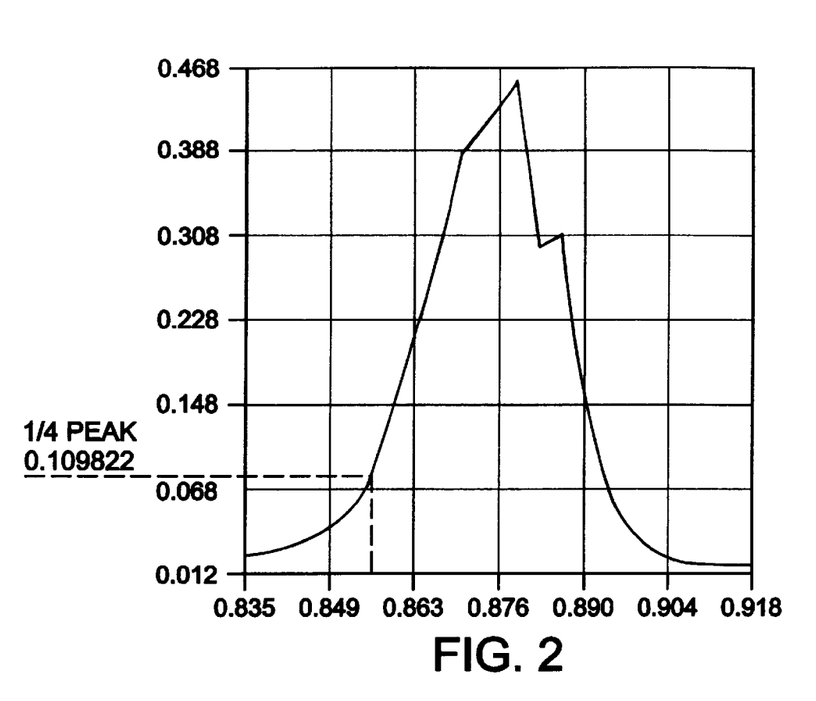
FIG. 2 is a graphical representation of a histogram distribution for a scanned sheet of white paper.

FIG. 2 shows an example of a histogram distribution generated from a scanned image. In particular, FIG. 2 shows a normalized histogram distribution for a scanned sheet of white paper. It is noted that the histogram distribution values illustrated in FIG. 2 have been normalized so that the maximum bin value is 0.45577. Also, the histogram scale has been normalized from a 0 to 255 range to a 0 to 1 range. The distribution is centered about the mean pixel value which is 0.875238. The standard deviation of this distribution of data has been calculated to be 0.875301.

Figure 3:
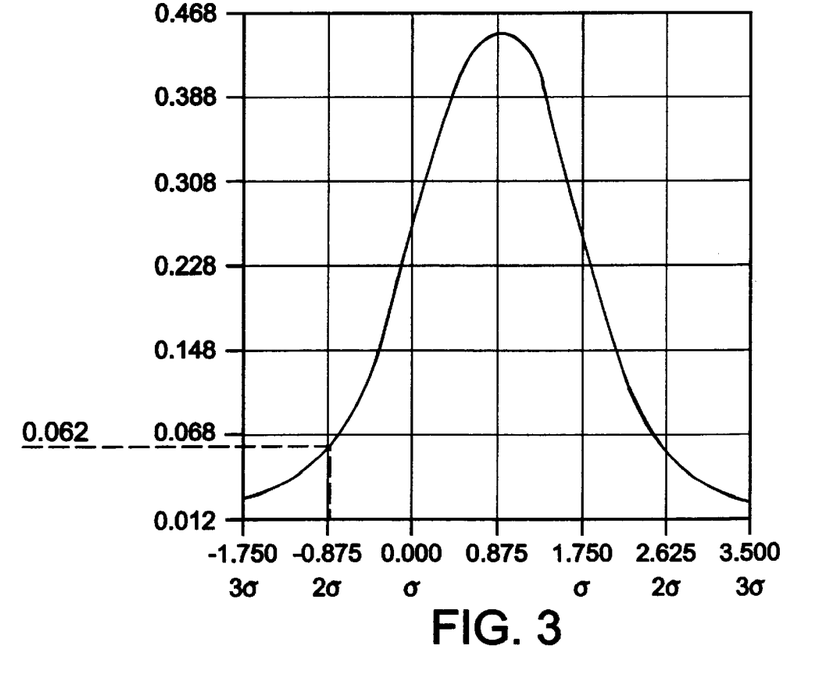
FIG. 3 is a graphical representation illustrating a normal Gaussian distribution curve having the same mean and standard deviation as the distribution illustrated in FIG. 2.

In comparison, FIG. 3 shows a normal Gaussian distribution curve having the same mean (0.875238) and same standard deviation value (0.875301) as in FIG. 2. As demonstrated by the illustrated distributions, the histogram distribution of the background video of a white piece of paper may be approximated by a normal Gaussian distribution curve.

Histogram data can be generated in many ways. For example, an entire image can be scanned and each pixel of the image is placed in a corresponding grey level bin to generate the histogram. On the other hand, only a window or subsample of the entire image may be gathered to create a histogram so as to determine the background value of the image. In the preferred embodiment, the histogram data includes bin values which range from 0 to 255 (for an eight bit system) where each bin value represents a particular grey level value of the image. Each bin value stores a frequency value indicating the number of times the associated grey level was found in the scanned portion of the image.

With further reference to FIG. 1, once the histogram data is compiled for a sample window, a background peak determinator 20 determines a background peak value from the frequencies stored in the bin values. The bin values for the histogram are read initially from the high intensity (white) spectrum to the low intensity (black) area of the spectrum. The number of pixels at each level (the frequency) is compared to a running stored maximum. The running stored maximum is updated until the slope of the background distribution in the histogram changes from a negative-slope to a positive-slope. This change potentially indicates that a peak has been passed and, thus, the bin value containing the stored maximum is potentially the background peak value.

To determine this change in slope, the five neighboring histogram bin values on the positive-slope side of the stored maximum and the three neighboring histogram values on the negative-slope side of the stored maximum are examined. If all eight neighboring bins have frequency values lower than the stored maximum, then the present bin value containing the stored maximum is set as the background peak for the image. In other words, the present bin represents a grey value having the peak frequency. To accommodate for the possibility of adjacent bins having equal values, the neighborhood test can be modified such that the neighboring bins on either side of the suspected peak may also be allowed to be equal to the peak value in order to satisfy the test.

Moreover, to prevent a false positive with respect to peak identification, the bin value for this peak location is also compared to a frequency threshold value. The frequency threshold value assures that the peak location is not merely an insignificant "blip" in the histogram. If the bin value for the peak location is greater than the frequency threshold value, the peak value is allowed to be set as the background peak of the image. The frequency threshold value may be any value determined by the user or can be predetermined in designing the system. For example, the threshold value may be about 1% of the total sample size when working with black and white images, or the threshold value may be the total sample size divided by 255 when working with colored images wherein the pixels are represented by 8-bits of image data.

To prevent mis-identification of a minor peak as background, once a peak has been found in the background distribution of the histogram, the background peak determinor continues the search of the histogram data to look for an adjacent larger peak utilizing the same neighbor test described above. If a larger peak is found, and a valley location has not yet been identified, this new larger peak is designated as the background peak or white peak location. A "valley" location is defined as a minimum point between two modes in the histogram. A determination of a valley location is fully described in U.S. Pat. No. 5, 751,848 mentioned above.

With further reference to FIGS. 2 and 3, the histogram data is then read for a second time to find a quarter (¼) peak location. Since, as discussed above, the typical histogram distribution closely resembles a normal Gaussian distribution, the determination of the quarter (¼) peak value represents a reasonable estimate of two sigma points from the mean (background peak) in the histogram. In other words, the grey level having a frequency less than or equal to ¼ the peak frequency represents a point that is two (2) standard deviations away from the mean or background peak point in the histogram distribution. To find the ¼ peak value, the histogram address is reset to 255 and when the previously found white peak location is reached, subsequent histogram bin values are compared with this maximum peak value (peak frequency value) until a grey level is found which has a frequency value less than or equal to ¼ of the frequency value associated with the white peak location.

To ensure that the quarter (¼) peak frequency location has been found, the three subsequent bin values are verified to have values less than or equal to the frequency value at the quarter (¼) peak location. Moreover, it is determined whether the difference between the quarter (¼) peak location and the white peak location is less than a threshold which may be programmable by the user. If the quarter (¼) peak location passes these two additional tests, the image background value can be determined from the peak frequency of the quarter (¼) peak location utilizing one of the formulas discussed below.

If the quarter (¼) peak frequency location cannot be determined because the background peak in the histogram is not dominant or there is another dominant mode in the histogram adjacent to the background mode, the background determiner 20 tries to find the grey level value which is one standard deviation away from the mean or peak value of the histogram. To find this grey level or peak location, the background determinor 20 also scans the histogram data to find the closest grey level which has a peak frequency equal to ⅝ of the peak frequency of the white peak.

It is noted that the difference in the number of grey levels between the white peak value and the grey level associated with ⅝ of the peak frequency value corresponds to the number of grey levels between the grey level associated with the ⅝ peak frequency and the grey level associated with the quarter (¼) peak frequency. Thus, the background determiner 20 determines an estimate for the quarter (¼) peak frequency location by utilizing the formula (2×⅝ peak)—peak. In other words, the grey level associated with the white peak is subtracted from 2 times the grey level value associated with the ⅝ peak value. The results of this formula are used as an estimated grey level value for the ¼ peak frequency of the histogram distribution. Additionally, the validity of the ⅝ peak value is checked by verifying whether the three (3) subsequent histogram bin values have frequency values less than or equal to the frequency value associated with this grey level.

As noted above, there may be situations where the quarter (¼) peak value cannot be found by scanning the histogram data. This is also true with respect to the ⅝ peak frequency value. In the situation where neither the quarter (¼) peak frequency value or the ⅝ peak frequency value can be found, the quarter (¼) peak frequency value can be estimated by calculating the difference between the peak frequency and the quarter (¼) peak frequency value on the negative-slope side of the background distribution curve.

This negative-slope side quarter (¼) peak frequency value is determined in the same manner as the positive-slope side quarter (¼) peak frequency value except for when the histogram is scanned in this process, the histogram is scanned from the higher values to the lower values up until the white peak location value has been reached. The quarter (¼) peak frequency value is estimated from the negative-slope side quarter (¼) peak frequency value utilizing the following formula: (2*peak)–¼ negative peak. In other words, the estimated quarter (¼) peak frequency value is the difference between the grey level value associated with the negative-slope side quarter (¼) peak frequency value and twice the grey level value of the white peak location. It is noted that the process for determining the quarter (¼) peak frequency value on the negative-slope side of the background distribution curve utilizes the same circuitry as that used to determine the quarter (¼) peak frequency value on the positive-slope side of the background distribution curve.

Figure 4:
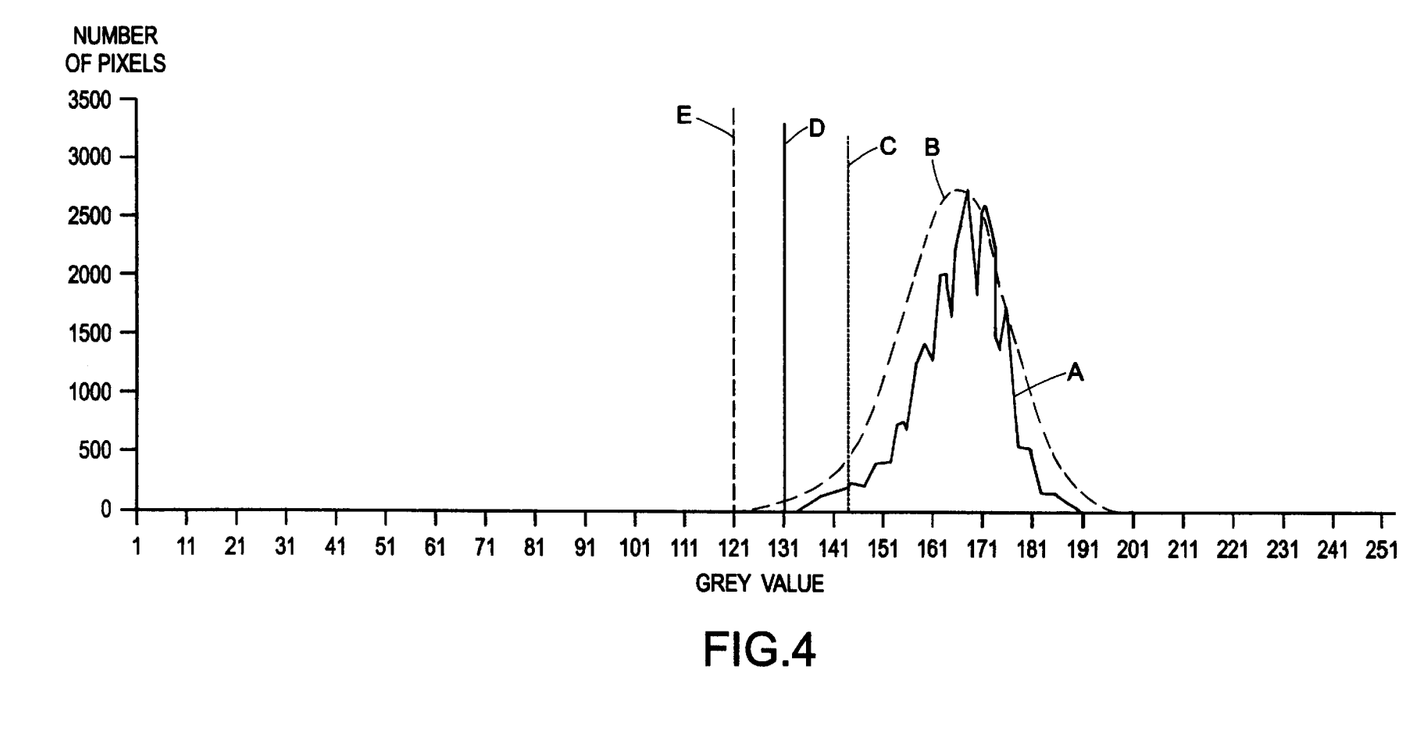
FIG. 4 illustrates an exemplary histogram distribution and a Gaussian approximation including a 2 sigma point and a 4 sigma point.

With reference to FIG. 4, an exemplary image histogram A generated from a scanned image is graphed with grey values on the x-axis and number of pixels on the y-axis. A true histogram Gaussian approximation B indicates the similarities between the distributions. A two sigma point at line C as determined from the above-described procedure represents a background threshold value which identifies the beginning of the background grey values. However, the 2 sigma value C is often not sufficient enough to capture all of the background pixels. It is desirable to have the background threshold value encompass more than 99.5% of the background pixels which approximately is at a four (4) sigma point D. Otherwise, objectional background spots will be reproduced. However, the 2 sigma value C is approximately the lowest point in the background distribution that can be reliably determined by analyzing the histogram distribution.

With further reference to FIG. 1, in order to expand the background threshold value from the two sigma point C, a thresholding circuit 25 estimates a new threshold value by computing multiples of the 2 sigma value. In this manner, a greater number of background grey values will be selected for suppression. In the preferred embodiment, the background threshold value is determined by equation (1) as:

$$WhiteThreshold = WhitePeak - BkgScaleFactor*(WhitePeak - QuarterPeak)$$

The WhiteThreshold value represents the new background threshold value and the WhitePeak value is the background peak value which was determined previously from the image histogram. The QuarterPeak value represents the grey value determined above as the grey value being two (2) standard deviations from the WhitePeak value. The BkgScaleFactor value represents a background scale factor which is selectable by a user to obtain a WhiteThreshold value which is between about 2 sigma and 4.875 sigma from the WhitePeak value. This range can be expanded if desired. Obtaining the four (4) sigma value E typically is an advantageous background value in order to ensure that substantially all background pixels (i.e. >99.5%) are suppressed in an image. In FIG. 4, line D represents the four sigma point of the histogram distribution wherein the histogram is of the entire scanned image and line E represents the four sigma point of the Gaussian approximation.

After a background scale factor is selected and the "WhiteThreshold" value is computed from the 2 sigma value, the validity of the WhiteThreshold value is compared against any adjacent valley location found in the histogram. If the threshold value is less than the valley location, the "WhiteThreshold" value is set equal to the valley location. The thresholding circuit 25 and its algorithm prevent the threshold value from being set too low when there is an adjacent distribution to the background distribution in the histogram.

In the preferred embodiment, the thresholding circuit 25 generates a "WhiteThreshold" which is between 2 sigma and 4.875 sigma from the WhitePeak value in increments of 0.125 (⅛) because a one eighth increment is easily implemented. The choice of components in the circuit can be minimized if "smart" combinations of digital logic are used so that much of the circuitry is shared. For example, preliminary calculations are determined based on the WhitePeak value and the QuarterPeak value. In the following calculations, peak_loc represents the "WhitePeak" grey value and the quar_peak_loc value represents the "QuarterPeak" grey value from equation (1). The difference between these values equals 2 sigma and is set as the "result" value. The calculations are as follows:

| | |
|---|---|
| Result | = Peak_loc - Quarter_peak_loc |
| half_result | = Result[7:1] |
| quarter_result | = Result[7:2] |
| eighth_result | = Result[7:3] |
| three_quarter result | = half_result + quarter_result |
| twice_result | = 2* Result[7:0] |

In the calculations, the value of "Result" is represented as Result[7:0] which is an 8-bit value equaling 2 sigma. The second number within the bracket indicates how many bits to drop during the operation. In this case, the number is 0 meaning that no bits are dropped, thus, giving the full value. This is further explained as follows. An efficient manner of computing multiples of the Result value is simply to drop selected bits which performs a divide operation. For example, the "half_result" value is set as "Result[7:1]" which is found by simply dropping one left most bit of the "Result" value which leaves one half of the Result value. In other words, the Result value is divided by 2. Similarly, the value "Result[7:2]" indicates that the 2 left most bits are dropped from the Result value which is a divide by 4 operation and produces a ¼ result value. Similar operations are also performed as shown to precompute values of ⅛ result, ¾ result, and twice the result. Alternately, the divide operation can be performed by shifting bits to the right by the second value in brackets. With this small group of combinations, the BkgScaleFactor can be easily computed to range from 0 to 2⅞ as shown below. Of course, different ranges are easily obtainable.

The following illustrates a set of computations to obtain the BkgScaleFactor shown in the second column (C2) ranging from 0 to 2⅞ in one eighth increments. The first column (C1) shows the computation number, in this case, ranging from 0 to 23. The third column (C3) describes the computation to obtain the final background threshold value based on equation (1) using the precomputed values from above:

| C1 | C2 | C3 |
|---|---|---|
| 0 | 0 | Peak_loc |
| 1 | ⅛ | Peak_loc – Result[7:3] |
| 2 | ¼ | Peak_loc – Result[7:2] |
| 3 | ⅜ | Peak_loc – {Result[7:3] + Result[7:2]} |
| 4 | ½ | Peak_loc – Result[7:1] |
| 5 | ⅝ | Peak_loc – {Result[7:1]+Result[7:3]} |
| 6 | ¾ | Peak_loc – {Result[7:1]+Result[7:2]} |
| 7 | ⅞ | Peak_loc– Result[7:1]+Result[7:2]+Result[7:3]} |
| 8 | 1 | Peak_loc – Result[7:0] |
| 9 | 1 ⅛ | {Peak_loc – Result[7:0]} – Result[7:3] |
| 10 | 1 ¼ | {Peak_loc – Result[7:0]} – Result[7:2] |
| 11 | 1 ⅜ | {Peak_loc – Result[7:0]} – {Result[7:2] + Result[7:3]} |
| 12 | 1 ½ | {Peak_loc – Result[7:0]} – Result[7:1] |
| 13 | 1 ⅝ | {Peak_loc – Result[7:0]} – {Result[7:1] + Result[7:3]} |
| 14 | 1 ¾ | {Peak_loc – Result[7:0]} – {Result[7:1]+ Result[7:2]} |
| 15 | 1 ⅞ | {Peak_loc – Result[7:0]} – {Result[7:1] + Result[7:2] + Result[7:3]} |
| 16 | 2 | Peak_loc – 2*Result[7:0] |
| 17 | 2 ⅛ | Peak_loc – 2*{Result[7:0] – Result[7:3]} |
| 18 | 2 ¼ | Peak_loc – 2*{Result[7:0] – Result[7:2]} |
| 19 | 2 ⅜ | Peak_loc – 2*{Result[7:0] – {Result[7:2] + Result[7:3]}} |

-continued

| C1 | C2 | C3 |
|---|---|---|
| 20 | 2 1/2 | Peak_loc − 2*{Result[7:0] − Result[7:1]} |
| 21 | 2 5/8 | Peak_loc − 2*{Result[7:0] − {Result[7:1] + Result[7:3]}} |
| 22 | 2 3/4 | Peak_loc − 2*{Result[7:0] − {Result[7:1] + Result[7:2]}} |
| 23 | 2 7/8 | Peak_loc − 2*{Result[7:0] − {Result[7:1] + Result[7:2] + Result[7:3]}} |

Figure 5:
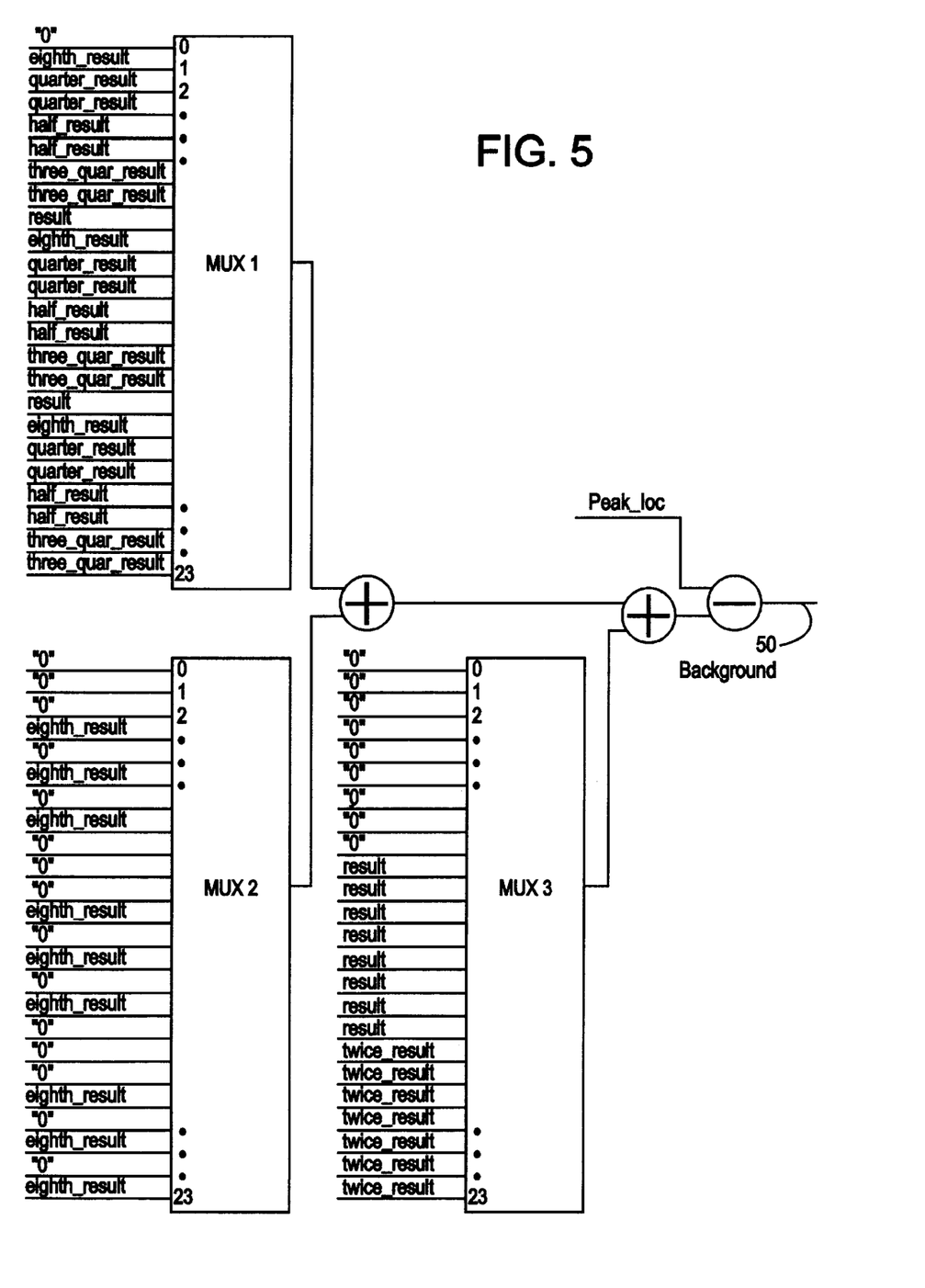
FIG. 5 illustrates an exemplary thresholding circuit to generate a white threshold value in accordance with the present invention.

With reference to FIG. 5, an exemplary thresholding circuit 25 is illustrated for generating the new background threshold value 50 (WhiteThreshold) according to the computations above. For purposes of clarity, the exemplary thresholding circuit is shown with all inputs to illustrate the variety of combinations to obtain a scale factor between 0 and 2 7/8 in one eighth increments. However, one of ordinary skill in the art can easily appreciate that the logic of the multiplexors as shown can be greatly reduced due to the duplicate nature of the multiplexor inputs. Not shown in FIG. 5 is a selector signal common to all the multiplexors MUX 1, MUX 2 and MUX 3. The selector signal designates one of the 0 to 23 inputs from each multiplexor to be combined based on a desired scaling factor selected by the user.

In experiments, the performance of the thresholding circuit and algorithm was tested against 279 scanned images. The 1/4 peak value {approximately 2 sigma} proved to be a good point to determine in the histogram distribution since in a substantial majority of the scanned images, the 1/4 peak value was able to be found. In about 65% of the images where the sample window contained only background pixels, the 4 sigma point was determined to within 3 grey levels or less than the actual 4 sigma value. The exact image statistics such as mean and standard deviation were computed for each image histogram and compared to the estimated values to evaluate the algorithm performance. For 25% of the images where the scanned sample window contained only background pixels and the 4 sigma point was estimated lower than 3 grey levels of the actual 4 sigma value, the determined background threshold value still encompassed more than 99% of the total background pixels.

It is to be appreciated that scanned images may produce a wide variety of histogram distributions which may include a wide variety of spike distributions and valley distributions. As such, the background peak determination 20 and standard deviation determinations may include appropriate data verification steps to ensure that the appropriate background peak value, 1/4 peak value, 5/8 peak value and the 15 adjusted WhiteThreshold value are correct. The verification steps are based on analyzing the histogram distribution values.

With reference again to FIG. 1, the WhiteThreshold generated by the thresholding circuit 25 defines a cut-off value for image grey values to be suppressed/eliminated from image reproduction. The WhiteThreshold value defines a range of background grey values which are to be suppressed where the upper limit of the range is defined by the highest available grey value. For example, in FIG. 4, if the WhiteThreshold value is set at the 4 sigma point E, then the grey values greater than the 4 sigma point are considered the background grey values of the image. Once the background grey values have been identified, they are eliminated and the image is reproduced 35 without the identified background grey values. Alternately, these two steps may be incorporated into one where the image reproduction 35 makes the determination which grey values to reproduce and which to suppress.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A system for eliminating background grey values from an image, the image being formed on a medium, the system comprising:
   a scanner for scanning the medium and converting the image into digital signals representing grey values of the image;
   a grey value histogram generator for generating a histogram of frequencies of the grey values of the image and determining a background peak value representing a background color having a peak frequency in the histogram; and
   a thresholding circuit for generating a background threshold value based on a difference between the background peak value and a scaled offset, the scaled offset including a scaling factor which is selectable, the background threshold value being a cutoff value for eliminating background grey values from a reproduction of the image.

2. The system as set forth in claim 1 wherein the scaled offset includes an offset value being at least one sigma from the background peak value, the offset value being combined with the scaling factor to provided the scaled offset.

3. The system as set forth in claim 2 wherein the offset value is two sigma from the background peak value.

4. The system as set forth in claim 1 wherein the thresholding circuit includes at least one multiplexor for providing a plurality of predetermined offset values which are combined based on a selected scaling factor to provide the scaled offset.

5. The system as set forth in claim 1 wherein the thresholding circuit generates the background threshold value to be between about two sigma and five sigma from the background peak value in 1/8th increments.

6. The system as set forth in claim 1 wherein the thresholding circuit determines the background threshold value based on an equation: background threshold value=background peak value−scaling factor*(2 sigma) where the 2 sigma is a value about 2 standard deviations from the background peak value based on the histogram.

7. The system as set forth in claim 6 wherein the scaling factor is selectable between 0 and 2 7/8 in 1/8 increments.

8. The system as set forth in claim 1 wherein the thresholding circuit is adapted to generate said background threshold value based on said difference between the background peak value and said scaled offset, the scaled offset including said scaling factor which is selectable between 0 and 2 7/8 in 1/8 increments.

9. An image processing system for reproducing an image formed of a plurality of pixels each represented by an image grey value and for suppressing background grey values of the image, the system comprising:
   a grey value histogram generator for generating histogram data representing frequencies of the image grey values;
   a background determiner for determining a peak grey value from the histogram data, the peak grey value being set as a background threshold value defining background grey values to be suppressed; and
   a thresholding circuit for dynamically adjusting the background threshold value to increase a number of the background grey values to be suppressed, the thresholding circuit adjusting the background threshold value based on a standard deviation from the peak grey value.

10. The image processing system as set forth in claim 9 wherein the thresholding circuit combines a plurality of predefined offset values which are selectable.

11. The image processing system as set forth in claim 10 wherein the thresholding circuit includes at least one multiplexor for selectively combining the plurality of predefined offset values as multiples of the standard deviation from the peak grey value.

12. The image processing system as set forth in claim 9 wherein the thresholding circuit determines the background threshold value based on an equation: background threshold value=peak grey value−scaling factor*(2 sigma) where the scaling factor is selectable by a user and 2 sigma is about 2 standard deviations from the peak grey value based on the histogram data.

13. A method suppressing a background mage from a document being reproduced, the document being formed of a plurality of video pixels each having a grey alue, the method comprising the steps of:

generating a arey value histogram representing a frequency of occurrence of the grey values based on the plurality of video pixels;

determining a background peak grey value from the histogram, the background peak grey value being a grey value having a greatest frequency of occurrence in the histogram, the background peak grey value being a basis for identifying a range of grey values representing the background image;

expanding the range of grey values representing the background image by scaling the background peak grey value; and reproducing the document without the range of grey values representing the background image.

14. The method suppressing a background image as set forth in claim 13 wherein the expanding includes determining a background threshold value which is offset from the background peak grey value by a scaled standard deviation from the background peak grey value.

15. The method suppressing a background image as set forth in claim 14 wherein the scaled standard deviation is between 2 sigma and 4.875 sigma.

16. The method suppressing a background image as set forth in claim 14 wherein the background threshold value equals the background peak grey value−a scale factor*(2 sigma).

17. The method suppressing a background image as set forth in claim 16 wherein the scale factor is selectable by a user in order to modify the range of grey values to be suppressed.

18. The method suppressing a background image as set forth in claim 17 wherein the scale factor is selectable from a predefined range.

19. The method suppressing a background image as set forth in claim 18 wherein the predefined range includes uniformly incremented values.

20. The method of claim 13 wherein the step of expanding the range of grey values includes determining a background threshold value which is offset from the background peak grey value by a scaled offset value, the scaling achieved with a scaling factor, the scaling factor being selectable between 0 and 2 7/8 in 1/8 increments.

21. An image processing system for reproducing an image formed of a plurality of pixels each represented by an image grey value and for suppressing background grey values of the image, the system comprising:

a histogram generator for generating histogram data representing frequencies of the image grey values;

a background determiner for determining a peak grey value from the histogram data, the peak grey value being set as a background threshold value defining the background grey values to be suppressed; and a thresholding circuit for dynamically adjusting the background threshold value to increase a number of the background grey values to be suppressed, the thresholding circuit adjusting the background threshold value based on an equation: background threshold value= peak grey value−scaling factor*(2 sigma), where the scaling factor is selectable by a user, between 0 and 2 7/8 in 1/8 increments, and 2 sigma is about 2 standard deviations from the peak grey value based on the histogram data.

* * * * *